(12) United States Patent
Liu

(10) Patent No.: US 12,147,661 B2
(45) Date of Patent: Nov. 19, 2024

(54) CONTENT SHARING METHOD AND ELECTRONIC DEVICE

(71) Applicant: VIVO MOBILE COMMUNICATION CO., LTD., Dongguan (CN)

(72) Inventor: Yamei Liu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/896,386

(22) Filed: Aug. 26, 2022

(65) Prior Publication Data

US 2022/0413670 A1  Dec. 29, 2022

Related U.S. Application Data

(63) Continuation of application No. PCT/CN2021/083585, filed on Mar. 29, 2021.

(30) Foreign Application Priority Data

Mar. 30, 2020 (CN) .......................... 202010237842.4

(51) Int. Cl.
 G06F 3/048 (2013.01)
 G06F 3/0486 (2013.01)
(52) U.S. Cl.
 CPC .................. *G06F 3/0486* (2013.01)
(58) Field of Classification Search
 CPC ....... G06F 3/0486; H04L 67/06; H04W 88/02
 See application file for complete search history.

(56) References Cited

U.S. PATENT DOCUMENTS

| 8,447,801 B1* | 5/2013 | Roche ................. G06F 16/1834 |
| | | 709/201 |
| 8,789,131 B2* | 7/2014 | Choi ....................... H04L 67/52 |
| | | 725/148 |
| 9,811,349 B2 | 11/2017 | Ooba |
| 9,900,415 B2 | 2/2018 | Kim |

(Continued)

FOREIGN PATENT DOCUMENTS

| CN | 103369026 A | 10/2013 |
| CN | 104980339 A | 10/2015 |

(Continued)

OTHER PUBLICATIONS

One Drive, One Drive Blog, Mar. 3, 2018, Updated Mar. 21, 2019, http://edit/anything.com/blog/onedrive_Three-lines.html.

*Primary Examiner* — Scott T Baderman
*Assistant Examiner* — Mario M Velez-Lopez
(74) *Attorney, Agent, or Firm* — The Webb Law Firm

(57) ABSTRACT

A content sharing method includes: receiving a first input for a first electronic device; and displaying a first interface on a screen of the first electronic device in response to the first input, the first interface including at least one of following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2.

20 Claims, 5 Drawing Sheets

(56) References Cited

U.S. PATENT DOCUMENTS

| | | | |
|---|---|---|---|
| 11,249,635 B2 | 2/2022 | Ye | |
| 11,573,678 B2* | 2/2023 | Dazé | G06F 3/0482 |
| 11,928,317 B2* | 3/2024 | Shaw | G06F 3/0482 |
| 2005/0091289 A1 | 4/2005 | Shappell et al. | |
| 2006/0146765 A1* | 7/2006 | Van De Sluis | G06F 3/016 |
| | | | 370/338 |
| 2013/0262578 A1 | 10/2013 | Kim | |
| 2013/0311947 A1* | 11/2013 | Tsai | G06Q 10/101 |
| | | | 715/815 |
| 2013/0332526 A1 | 12/2013 | Hurley et al. | |
| 2014/0032673 A1 | 1/2014 | Mallet et al. | |
| 2014/0040803 A1* | 2/2014 | Briand | G06F 3/0486 |
| | | | 715/769 |
| 2015/0095451 A1 | 4/2015 | Homsany | |
| 2015/0363099 A1 | 12/2015 | Mattingly et al. | |
| 2015/0373065 A1* | 12/2015 | Holmquist | H04L 65/1069 |
| | | | 715/753 |
| 2018/0167451 A1* | 6/2018 | Yi | H04L 65/1069 |
| 2019/0354556 A1 | 11/2019 | Cho et al. | |
| 2020/0081590 A1 | 3/2020 | Lapier et al. | |
| 2020/0249835 A1 | 8/2020 | Ueno et al. | |
| 2020/0257425 A1* | 8/2020 | Ye | G06F 3/0486 |
| 2022/0100354 A1 | 3/2022 | Ning et al. | |

FOREIGN PATENT DOCUMENTS

| | | |
|---|---|---|
| CN | 106411686 A | 2/2017 |
| CN | 106850711 A | 6/2017 |
| CN | 107360064 A | 11/2017 |
| CN | 109388620 A | 2/2019 |
| CN | 109408476 A | 3/2019 |
| CN | 109889348 A | 6/2019 |
| CN | 109977081 A | 7/2019 |
| CN | 111459355 A | 7/2020 |
| EP | 2466921 A2 | 6/2012 |
| EP | 3392751 A1 | 10/2018 |
| JP | 2011070511 A | 4/2011 |
| JP | 2013205945 A | 10/2013 |
| JP | 2015527628 A | 9/2015 |
| JP | 2017010069 A | 1/2017 |
| WO | 2004075169 A2 | 9/2004 |
| WO | 2017081970 A1 | 5/2017 |
| WO | 2019071872 A1 | 4/2019 |
| WO | 2019114828 A1 | 6/2019 |

* cited by examiner

CONTENT SHARING METHOD AND ELECTRONIC DEVICE

CROSS-REFERENCE TO RELATED APPLICATIONS

This application is Bypass Continuation Application of PCT/CN2021/083585 filed Mar. 29, 2021, and claims priority to Chinese Patent Application No. 202010237842.4 filed on Mar. 30, 2020, the disclosures of which are hereby incorporated by reference in their entirety.

BACKGROUND OF THE INVENTION

Field of the Invention

Embodiments of the present disclosure relate to the field of communications technologies, and in particular, to a content sharing method and an electronic device.

Description of Related Art

With the development of communications technologies, electronic devices such as mobile phones and tablet computers are becoming more intelligent to meet various needs of users. For example, users are increasingly demanding the convenience of sharing content among a plurality of electronic devices.

SUMMARY OF THE INVENTION

Embodiments of the present disclosure provide a content sharing method and an electronic device.

According to a first aspect, an embodiment of the present disclosure provides a content sharing method applied to a first electronic device. The method includes: receiving a first input for the first electronic device; and displaying a first interface on a screen of the first electronic device in response to the first input, the first interface including at least one of the following: a first identifier or N second identifiers, where the first electronic device is one of N electronic devices constituting a target sharing group, the first identifier is an entry to a first content, and the first content is a content shared in the target sharing group by at least two of the N electronic devices; a second identifier is an entry to a second content, and the second content is a content shared in the target sharing group by one of the N electronic devices; and N is a positive integer greater than or equal to 2.

According to a second aspect, an embodiment of the present disclosure further provides an electronic device. The electronic device is a first electronic device, and includes: a receiving module, configured to receive a first input for the first electronic device; and a displaying module, configured to display a first interface on a screen of the first electronic device in response to the first input received by the receiving module, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2.

According to a third aspect, an embodiment of the present disclosure provides an electronic device, including a processor, a memory, and a computer program stored on the memory and executable on the processor. The computer program, when executed by the processor, implements the steps of the content sharing method described in the first aspect.

According to a fourth aspect, an embodiment of the present disclosure provides a non-transitory computer-readable storage medium, storing a computer program. The computer program, when executed by a processor, implements the steps of the content sharing method described in the first aspect.

DESCRIPTION OF THE INVENTION

Figure 1:
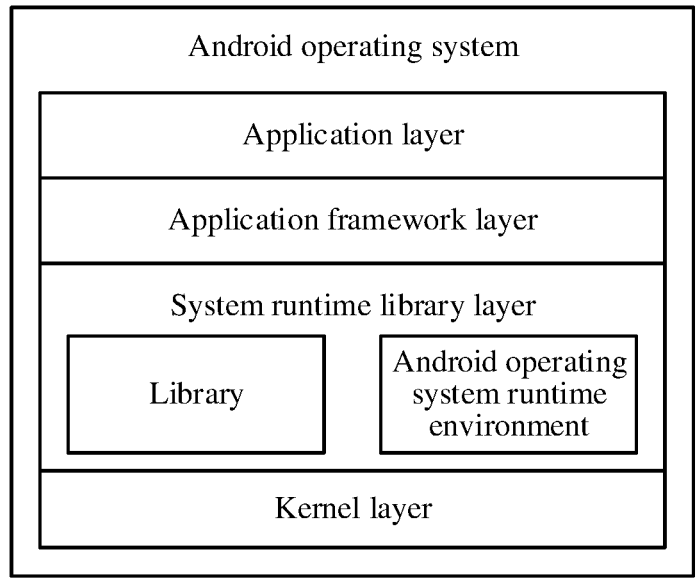
FIG. 1 is a schematic architectural diagram of a possible Android operating system according to an embodiment of the present disclosure.

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

It should be noted that "/" in this specification means or. For example, A/B may represent A or B. The term "and/or" in this specification is only an association relationship for describing associated objects and represents that three relationships may exist. For example, A and/or B may represent the following three cases: Only A exists, both A and B exist, and only B exists. "A plurality of" represents two or more than two.

It should be noted that, in the embodiments of the present disclosure, the terms such as "exemplarily" or "for example" are used to represent giving an example, an illustration or a description. Any embodiment or design scheme described as "exemplarily" or "for example" in the embodiments of the present disclosure should not be explained as being more preferable or having more advantages than other embodiments or design schemes. In particular, the terms such as "exemplarily" and "for example" as used herein are intended to present the related concept in a specific implementation.

The terms "first", "second", and the like in this specification and claims of the present disclosure are used to distinguish between different objects but are not used to describe a particular order of objects. For example, a first input, a second input, and the like are used to distinguish between different inputs but are not used to describe a particular order of inputs.

Currently, in scenarios in which one electronic device needs to share content with a plurality of electronic devices, one electronic device can usually only view content (e.g., a screen interface, an application package, and a media file such as an image or a video) shared by another electronic device at the same moment. For example, an electronic device 1 can establish a connection with an electronic device 2 and share a screen interface. For example, the electronic device 1 remotely controls the screen interface of the electronic device 2 to view content in the electronic device 2, thereby sharing content between the two electronic devices. In this case, if the electronic device 1 needs to share the screen with another electronic device (e.g., an electronic device 3) to share content, the electronic device 1 needs to first disconnect from the electronic device 2, establish a connection with the electronic device 3, and share a screen interface of the electronic device 3. In this way, steps of sharing content among a plurality of electronic devices are complex.

According to a content sharing method provided in the embodiments of the present disclosure, a first input for a first electronic device is received, and a first interface (i.e., a content sharing interface of a sharing group) is displayed on a screen of the first electronic device, the first interface including at least one of the following: a first identifier or N second identifiers; where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2. In this way, the first electronic device can obtain the entry to the content shared by each electronic device in the sharing group at the same moment, and then can obtain the content shared by the corresponding electronic device through any entry. There is no need to separately establish connections between one electronic device and two or more other electronic devices at different moments to share the screen interface and then share the content. In this way, the steps of sharing content among a plurality of electronic devices can be simplified, and the content shared among a plurality of electronic devices can be displayed quickly, easily and visually.

The electronic device in the embodiments of the present disclosure may be a mobile electronic device or a non-mobile electronic device. The mobile electronic device may be a mobile phone, a tablet computer, a notebook computer, a palmtop computer, an in-vehicle terminal, a wearable device, an ultra-mobile personal computer (UMPC), a netbook, a personal digital assistant (PDA), or the like. The non-mobile electronic device may be a personal computer (PC), a television (TV), a teller machine, a self-service machine, or the like. This is not specifically limited in the embodiments of the present disclosure.

It should be noted that, in the content sharing method provided in the embodiments of the present disclosure, an execution subject may be an electronic device, or a central processing unit (CPU) of the electronic device, or a control module in the electronic device for performing the content sharing method. The content sharing method provided in the embodiments of the present disclosure is described using an example in which the content sharing method is performed by the electronic device.

The electronic device in the embodiments of the present disclosure may be an electronic device with an operating system. The operating system may be an Android (Android) operating system or may be an ios operating system or may be another possible operating system. This is not specifically limited in the embodiments of the present disclosure.

An Android operating system is used as an example below to describe a software environment to which the content sharing method provided in the embodiments of the present disclosure is applied.

FIG. 1 is a schematic architectural diagram of a possible Android operating system according to an embodiment of the present disclosure. In FIG. 1, the architecture of the Android operating system includes four layers: an application layer, an application framework layer, a system runtime library layer, and a kernel layer (which may be a Linux kernel layer).

The application layer includes various applications (including a system application and a third-party application) in the Android operating system.

The application framework layer is a framework for applications, and a developer may develop some applications such as a system settings application, a system chatting application, and a system camera application, or a third-party settings application, a third-party camera application, a third-party chatting application based on the application framework layer in the case of conforming to the development principle of the framework for applications.

The system runtime library layer includes a library (also referred to as a system library) and an Android operating system runtime environment. The library mainly provides the Android operating system with various types of resources required by the Android operating system. The Android operating system runtime environment is used to provide the Android operating system with a software environment.

The kernel layer is an operating system layer of the Android operating system and is the bottommost layer in software layers of the Android operating system. The kernel layer provides the Android operating system with kernel system services and hardware-related drive programs based on the Linux kernel.

Using the Android operating system as an example, in the embodiments of the present disclosure, based on the system architecture of the Android operating system shown in FIG. 1, a developer may develop a software program for implementing the content sharing method provided in the embodiments of the present disclosure, so that the content sharing method may be performed based on the Android operating system shown in FIG. 1. That is, the processor or the electronic device may run the software program in the Android operating system to implement the content sharing method provided in the embodiments of the present disclosure.

Figure 2:
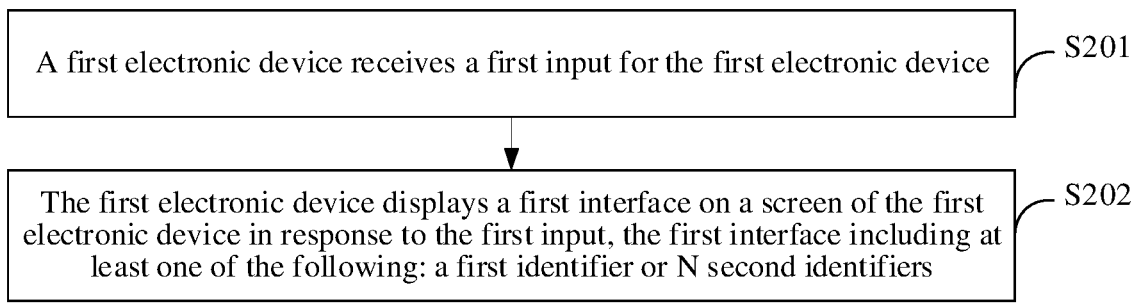
FIG. 2 is a flowchart of a content sharing method according to an embodiment of the present disclosure.

The content sharing method provided in the embodiments of the present disclosure is described in detail below with reference to a flowchart of the content sharing method shown in FIG. 2. Although the logical order of the content sharing method provided in the embodiments of the present disclosure is shown in the flowchart, in some cases, the steps shown or described may be performed in an order different from the order herein. For example, the content sharing method shown in FIG. 2 may include S201 and S202.

S201: A first electronic device receives a first input for the first electronic device.

The first electronic device is one of N electronic devices constituting a target sharing group.

It should be noted that, in the embodiments of the present disclosure, a sharing group (such as the target sharing group described below) may be established for a plurality of electronic devices, so that the plurality of electronic devices may share content based on the sharing group, for example, display the content shared in each of the plurality of electronic devices based on a content sharing interface (such as the first interface described below) of the sharing group.

Optionally, the first input is used to trigger the first electronic device to display a content sharing interface of the sharing group, such as the first interface.

S202: The first electronic device displays a first interface on a screen of the first electronic device in response to the first input, the first interface including at least one of the following: a first identifier or N second identifiers.

The first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2.

Optionally, the first identifier and the N second identifiers may all be implemented in the form of text, icon, or the like.

Optionally, a collection of content indicated by the first identifier may be a public center of the N electronic devices in the target sharing group, and the collection of content indicated by the first identifier is hereinafter referred to as the "public center".

Optionally, in an application scenario 1 of the embodiments of the present disclosure, the first interface is a first desktop interface of the first electronic device (such as device A), and the first input is an input to a desktop interface other than the first desktop interface of the first electronic device. In this case, the first interface can be implemented through a virtual screen (i.e., a virtual screen shared among all electronic devices in the target sharing group).

Optionally, in an application scenario 2 of the embodiments of the present disclosure, the first interface is a floating interface of the first electronic device, and the first input is an input to a floating control displayed on the screen of the first electronic device. In this case, the first interface can be implemented through a floating screen (i.e., a floating screen shared among all electronic devices in the target sharing group). The floating control may be the entry to the floating screen.

Optionally, the floating screen may be displayed on the screen of the first electronic device at any size. Moreover, the display size of the floating control is usually small (e.g., smaller than the display size of an application icon), and the display shape of the floating control may be any realizable shape, such as a circle or a rectangle. This is not specifically limited in the embodiments of the present disclosure.

It should be noted that, <1> the floating screen and the virtual screen display the same content. <2> There is a difference between the floating screen and the virtual screen in display modes: the floating screen can pop up and be displayed on any interface of the electronic device (such as the first electronic device), while the virtual screen is generally displayed on the desktop interface of the electronic device (such as the first electronic device). In this way, the virtual screen is smoother and easier to operate on the desktop interface, while the floating screen can quickly pop up in all scenarios (such as in the interface of an application and on the desktop). <3> The virtual screen and the floating screen may be mixed up on the use description, and both refer to the form of the interface that displays the shared content in the sharing group (e.g., the target sharing group).

It may be understood that, after a plurality of electronic devices establish a sharing group through a set of protocols, each electronic device has its own shared content that is shared to the sharing group. A new page of virtual screen is added or a new floating screen is added on each electronic device, and the virtual screen (or the floating screen) includes a collection of content shared by all of the plurality of electronic devices. For example, in a case that the target sharing group includes the electronic devices A, B . . . and N, the first interface displayed by the virtual screen (or the floating screen) includes the shared content in the electronic devices A, B . . . and N. The "public center" (i.e., the collection of content indicated by the first identifier) is a full collection of shared data for all the devices A, B . . . and N.

Figure 3:
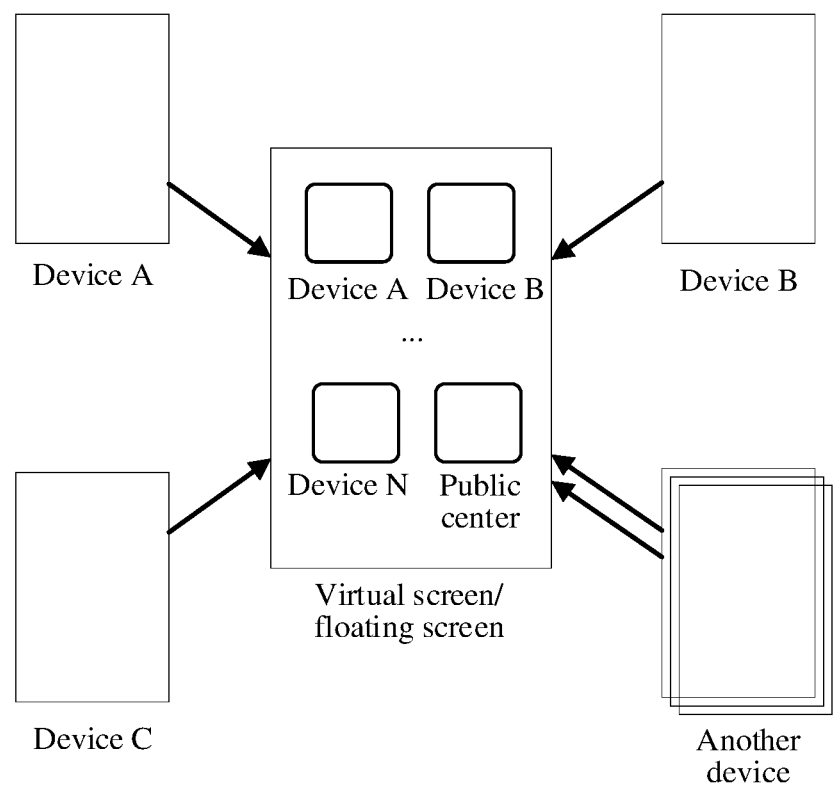
FIG. 3 is a schematic diagram 1 of display content of an electronic device according to an embodiment of the present disclosure.

Exemplarily, FIG. 3 is a schematic diagram of display content of an electronic device. An interface displayed in the virtual screen or the floating screen shown in FIG. 3 is the first interface (i.e., the content sharing interface), an identifier "Device A" to an identifier "Device N" included in the first interface are the N second identifiers, and an identifier "public center" is the first identifier.

Figure 4:
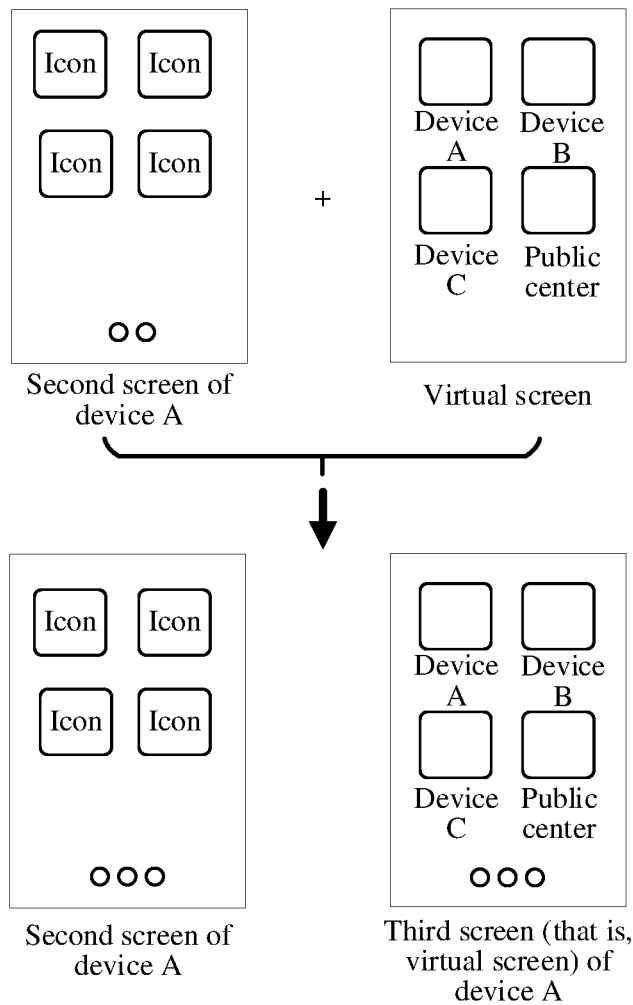
FIG. 4 is a schematic diagram 2 of display content of an electronic device according to an embodiment of the present disclosure.

Exemplarily, FIG. 4 is a schematic diagram of display content of an electronic device. For example, based on the application scenario 1, FIG. 4 shows the electronic device adding a new virtual screen to the desktop interface at the position of the first desktop interface on the local screen of device A as the last screen interface. Assuming that there are two desktop interfaces (i.e., a first screen of device A and a second screen of device A) on device A (i.e., the first electronic device), after the virtual screen on which the first desktop interface is located (i.e., a third screen of device A) is added to the desktop of device A, device A becomes a three-screen desktop interface. That is, the new desktop interface after the virtual screen is added consists of the old desktop interface and the virtual screen, and the virtual screen is displayed after the local desktop interface of device A. Certainly, the virtual screen can also be placed in the position of another desktop interface in the mid-desktop of device A, such as the first desktop interface.

Optionally, the process of establishing and applying the sharing group among a plurality of electronic devices is described by steps (1) to (5) as follows.

(1) The plurality of devices establish a sharing group (i.e., a sharing group, such as a target sharing group).

The plurality of devices can establish the sharing group through wireless fidelity (Wi-Fi or wifi), Bluetooth, near field communication (NFC), the 5th generation mobile communication technology (the 5th generation mobile communication technology, 5G), or the like. When the plurality of electronic devices establish a sharing group, a protocol for establishing the sharing group (e.g., through a server) may be triggered), and the protocol may be centralized or decentralized. For example, the sharing group may be established by the plurality of electronic devices by generating a set of unique codes through the protocol and inputting the unique codes separately.

(2) Each electronic device selects the content to be shared.

Optionally, during the establishment of the sharing group, each electronic device (e.g., the first electronic device) is prompted to select the content to be shared. For example, device A (i.e., the first electronic device) may select the shared content such as several screens of the screen interface, a certain type of file, some specific files, or system profile information.

(3) The sharing group is established successfully.

After all the electronic devices that are to establish the sharing group have been filled with unique codes and shared information, the sharing group is established successfully through the protocol. The communication protocol of the sharing group may be centralized, for example, operation information for the virtual screen on each electronic device is transmitted to decision center through the protocol, and then the decision center arbitrates and distributes an operation behavior to the other corresponding electronic devices. The protocol can also be peer-to-peer, for example, the virtual screen operated on device A is of device B (e.g., one electronic device other than the first electronic device among N electronic devices). In this case, only device A and device B need to communicate and interact directly.

(4) Each electronic device establishes a shared virtual screen or floating screen.

After the sharing group is established successfully, a virtual screen or floating screen for displaying the content sharing screen of the sharing group (such as the first interface) is established on each electronic device.

(5) Interaction on each electronic device through a virtual screen (floating screen).

For the established sharing group, the electronic devices in the sharing group can interact, for example, share content, access content, or retrieve content, through the content sharing interface displayed on respective virtual screens (or floating screens). (This process is specifically described in detail in the following embodiments, and is not repeated herein).

Optionally, in the embodiments of the present disclosure, the first content includes all data of all of the N electronic devices, that is, the first content is full data of the N electronic devices; and the second content includes all data of a corresponding electronic device of the N electronic devices, that is, the second content is full data of the corresponding electronic device.

Optionally, in the embodiments of the present disclosure, the first content includes at least one level of sub content, and each second content includes at least one level of sub content. The former one level of content is an entry to the next one level of content. In the following embodiments, the level of content is also referred to as a sharing level of content. Exemplarily, a low sharing level is a refinement of a high sharing level.

Figure 5:
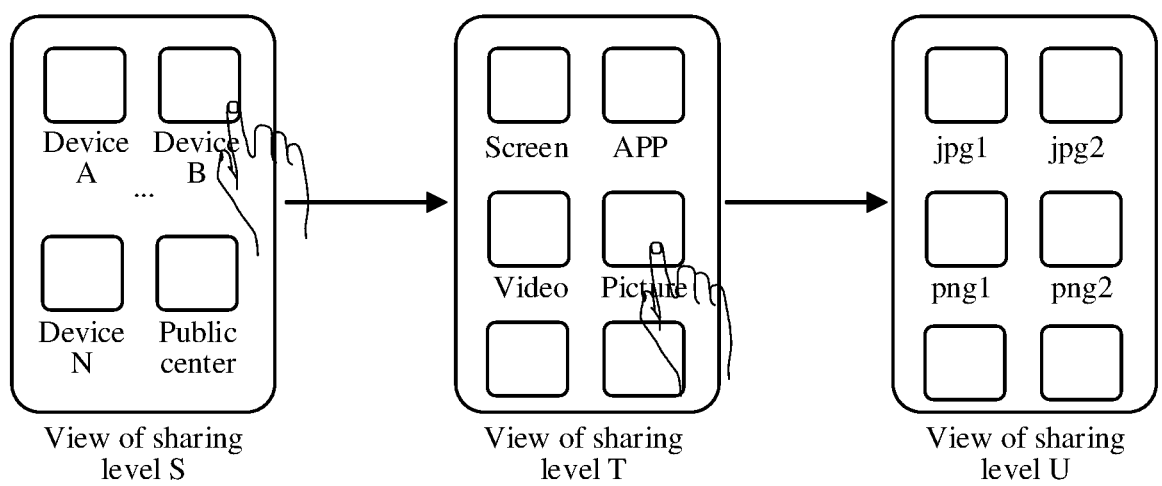
FIG. 5 is a schematic diagram 3 of display content of an electronic device according to an embodiment of the present disclosure.

Exemplarily, referring to FIG. 5, in the embodiments of the present disclosure, the sharing level is classified into a sharing level S, a sharing level T, and a sharing level U according to the inclusion hierarchy of the shared content in the order of refinement, and may also be classified according to other hierarchical classification methods. The sharing level S is the default highest level of content when a floating screen (or virtual screen) pops up. Exemplarily, the sharing level examples herein are classified into the sharing level S, the sharing level T, and the sharing level U according to the inclusion hierarchy of the shared content in the order of refinement, and may also be classified according to other hierarchical classification methods. The sharing level S is the default highest level of view when the sharing floating window pops up, showing the same content as that of the virtual screen. The sharing level S includes a top-level view of content shared by all devices of the N electronic devices, and a shared view "public center" of the full data. For example, if one of the views, "Device B", is tapped, a view of the next sharing level T is displayed, and the view includes all the content shared by device B, such as shared screens, APPs (i.e., applications), audio and video, pictures, other files, and other information views. Then, the "Picture" view in the view of the sharing level T is tapped, a view of the next sharing level U is displayed, and the view includes all pictures (such as pictures represented by jpg1, jpg2, png1, and png2) shared by device B.

Optionally, in the embodiments of the present disclosure, different sub contents in the first content are arranged according to content types, and the different sub contents in each second content are arranged according to the content types. The content types of the first content include at least one of the following: an operable screen interface, an application file, a system profile, or a media file; and the content types of the second content include at least one of the following: an operable screen interface, an application file, a system profile, or a media file.

Exemplarily, as shown in FIG. 5, the content types of content shared by device B in the sharing group include: an operable screen interface (e.g., "Screen" in the sharing level T), an application file (e.g., "APP" in the sharing level T), a system profile, and a media file (e.g., "Video" and "Picture" in the sharing level T).

Optionally, the content sharing method provided in the embodiments of the present disclosure may further include S203 and S204.

S203: A first electronic device receives a second input.

S204: The first electronic device performs a target operation in response to the second input.

The target operation is any one of a first operation, a second operation, or a third operation.

Optionally, in an example 1 of the embodiments of the present disclosure, the target operation is the first operation. The first operation is: in a case that a third identifier corresponding to the second electronic device is selected and a first target content of the first electronic device is selected, sending the first target content to the second electronic device, and adding the first target content to the content shared by the second electronic device in the sharing group.

Optionally, in the example 1, in a case that the target operation is the first operation, the second input includes a first sub input and a second sub input. In some embodiments, S204 may be implemented through S204*a* and S204*b*.

S204*a*: The first electronic device displays a fifth identifier of the first target content on the screen of the first electronic device in response to the first sub input to the third identifier on the first interface.

S204*b*: In response to the second sub input to the fifth identifier, the first electronic device sends the first target content to the second electronic device, adds the first target content to the content indicated by the third identifier, and triggers the second electronic device to process the first target content according to a content type of the first target content.

Optionally, in an example 2 of the embodiments of the present disclosure, the target operation is the second operation. The second operation is: in a case that a fourth identifier corresponding to a third electronic device is selected and a second target content of the third electronic device is selected, processing the second target content based on a preset rule.

Optionally, the preset rule is used to indicate any one of the following rules 1 to 3.

The rule 1 is used to indicate: the first electronic device saves the second target content to a target storage position of the first electronic device, where the target storage position is a user-defined storage position in the first electronic device, or a storage position associated with a content type of the second target content.

The rule 2 is used to indicate: in a case that the second target content is an installation package of a target application of a first version, if the target application has not been installed in the first electronic device, the first electronic device installs the target application in the first electronic device according to the second target content; if the target application of a second version has been installed in the first electronic device and the second version is different from the first version, the first electronic device updates a version of the target application to the first version in the first electronic device according to the second target content; and if configuration information of the target application installed in the first electronic device is different from configuration information of the target content, the first electronic device updates the configuration information of the target application in the first electronic device to the configuration information of the second target content.

The rule 3 is used to indicate: in a case that the second target content is a target system profile, the first electronic device overwrites a system profile in the first electronic device with the target system profile in response to a selection input to the target system profile.

Optionally, in an example 3 of the embodiments of the present disclosure, the target operation is the third operation. The third operation is: searching, according to a target keyword selected by a user, the first content and/or the N second contents for a third target content including the target keyword.

The third identifier and the fourth identifier are both identifiers of the first identifier and the N second identifiers; and the second electronic device and the third electronic device are both electronic devices of the N electronic devices.

Optionally, in the example 2, in a case that the target operation is the second operation, the second input includes a third sub input and a fourth sub input. In some embodiments, S204 may be implemented through S204c and S204d.

S204c: In a case that the fourth identifier is displayed on the screen of the first electronic device, the first electronic device displays a sixth identifier indicated by the second target content on the screen of the first electronic device in response to the third sub input to the fourth identifier.

S204d: The first electronic device processes the second target content based on the preset rule in response to the fourth sub input to the sixth identifier.

Optionally, the content sharing method provided in the embodiments of the present disclosure may further include S205 after S202.

S205: The first electronic device displays an eighth identifier at a display position corresponding to the seventh identifier on the first interface.

The seventh identifier is an identifier of the first identifier and the N second identifiers, and the eighth identifier is used to indicate that a fourth electronic device corresponding to the seventh identifier has updated the content shared in the sharing group. The content updated by the fourth electronic device in the sharing group is sent by a fifth electronic device of the N electronic devices to the fourth electronic device, or is the content in the fourth electronic device.

Figure 6:
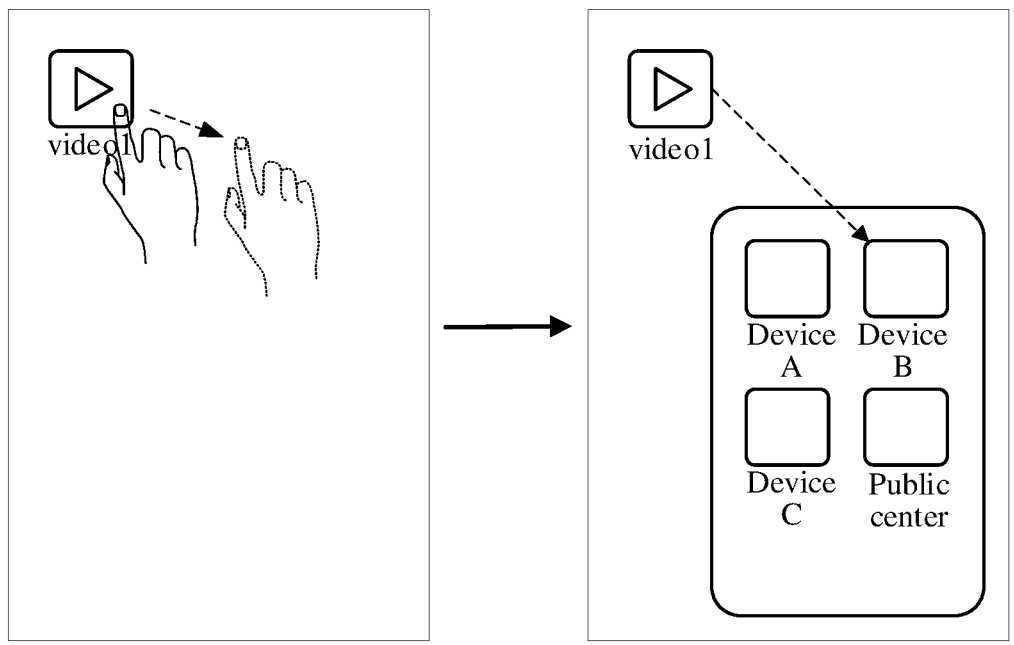
FIG. 6 is a schematic diagram 4 of display content of an electronic device according to an embodiment of the present disclosure.

Referring to FIG. 6, on any interface of device A, such as an interface including a video file identifier "video1" (e.g., the fifth identifier), when a user drags the file icon to a certain distance, a top-level view of the floating screen (i.e., a view of the sharing level S) pops up. The user keeps dragging the video file identifier "video1" without releasing, and releases when dragging to the following different icons, which represent different semantics.

(1) Dragging the identifier "video1" to the identifier "device B" represents sending the local file "video1" of device A to device B. In this case the floating screen of device B pops up to remind that there is a file sent from device A, confirming whether to receive the file or receive the file by default. On device B, the received file is automatically placed under a fixed position path of device B according to information such as the user habits and the file type, and the position receiving information is prompted or recorded.

(2) Dragging the identifier "video1" to the identifier "Device A" represents device A updating a new file indicated by the identifier "video1" to the target sharing group. In this case, there is system prompt information on other device B and device C or a red dot icon on the floating screen to remind device B and device C to pay attention to a new sharing content (i.e., the file indicated by the identifier "video1") in the target sharing group.

(3) Dragging the identifier "video1" to the identifier "public center" is equivalent to sending the file indicated by the identifier "video1" to all electronic devices in the target sharing group and updating the file to the inside of the "public center" (i.e., the collection of contents indicated by the first identifier).

Moreover, for the floating screen of device A, the user can also find shared content of interest on the floating screen or virtual screen of "Device A", and explicitly drag the shared content or an entry identifier of the shared content to the identifiers of other devices, to send the content to the other devices.

Figure 7:
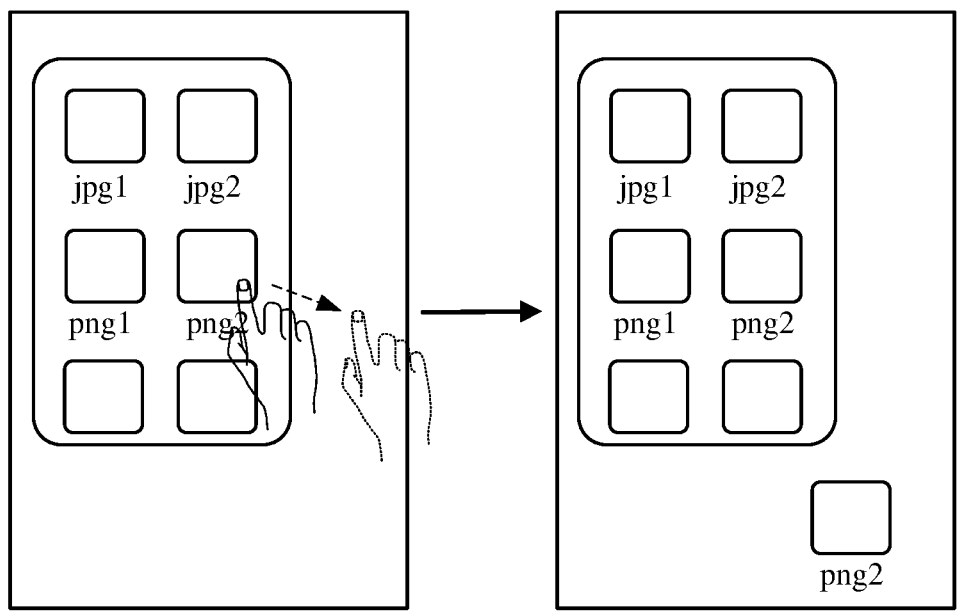
FIG. 7 is a schematic diagram 5 of display content of an electronic device according to an embodiment of the present disclosure.

Referring to FIG. 7, assuming that the local device A needs to obtain a file indicated by the identifier "png2" from device B in the target sharing group, there are the following steps.

(1) Tap the identifier "Device B" (i.e., the sixth identifier), find the file "png2" from the view of the sharing level S to the view of the sharing level T and then to the view of the sharing level U, and then drag the identifier to a certain distance. In this case, device B controls the file indicated by "png2" to be automatically transmitted to the local device A, and store the file under the corresponding path in device A according to the user habit and the file type, or reminds which path the user intends to place the file under.

(2) A "search" button can be added to the floating screen (although the button is not detailed on FIG. 7, the "search" button can be shown on the actual floating screen). The user taps the "search" button on the floating window, which can trigger device A to retrieve, according to some keywords (such as the target keyword), which devices data to be searched in the sharing group on the view of the sharing level S in the sharing group is in.

According to the content sharing method provided in the embodiments of the present disclosure, a first input for a first electronic device is received, and a first interface (i.e., a content sharing interface of a sharing group) is displayed on a screen of the first electronic device, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; N is a positive integer greater than or equal to 2. In this way, the first electronic device can obtain the entry to the content shared by each electronic device in the sharing group at the same moment, and then can obtain the content shared by the corresponding electronic device through any entry. There is no need to separately establish connections between one electronic device and two or more other electronic devices at different moments to share the screen interface and then share the content. In this way, the steps of sharing content among a plurality of electronic devices can be simplified, and the content shared among a plurality of electronic devices can be displayed quickly, easily and visually.

Figure 8:
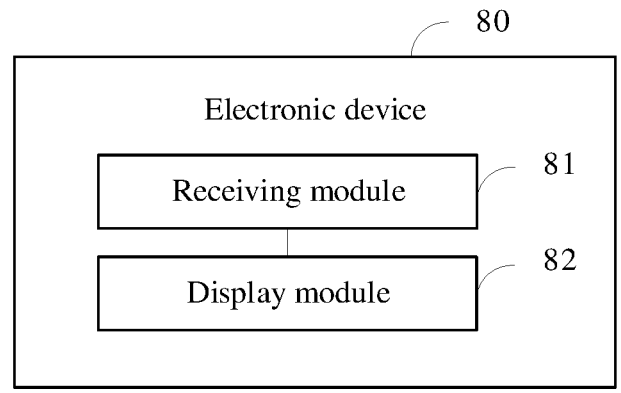
FIG. 8 is a schematic structural diagram of an electronic device according to an embodiment of the present disclosure.

FIG. 8 is a schematic structural diagram of an electronic device according to an embodiment of the present disclosure. The electronic device shown in FIG. 8 includes: a receiving module 81, configured to receive a first input for a first electronic device; and a displaying module 82, configured to display a first interface on a screen of the first electronic device in response to the first input received by the receiving module 81, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2.

The first interface is a first desktop interface of the first electronic device, and the first input is an input to a desktop interface other than the first desktop interface of the first electronic device; or the first interface is a floating interface of the first electronic device, and the first input is an input to a floating control displayed on the screen of the first electronic device.

Optionally, the first content includes all data of all of the N electronic devices; and the second content includes all data of one of the N electronic devices.

Optionally, different sub contents in the first content are arranged according to content types, and the different sub contents in each second content are arranged according to the content types. The content types of the first content include at least one of the following: an operable screen interface, an application file, a system profile, or a media file; and the content types of the second content include at least one of the following: an operable screen interface, an application file, a system profile, or a media file.

Optionally, the first content includes at least one level of sub content, and each second content includes at least one level of sub content. The former one level of content is an entry to the next one level of content.

Optionally, the receiving module 81 is further configured to receive a second input. The electronic device 50 further includes: an execution module, configured to perform a target operation in response to the second input received by the receiving module 81. The target operation is any one of a first operation, a second operation, or a third operation. The first operation is: in a case that a third identifier corresponding to the second electronic device is selected and a first target content of the first electronic device is selected, sending the first target content to the second electronic device, and adding the first target content to the content shared by the second electronic device in the sharing group. The second operation is: in a case that a fourth identifier corresponding to a third electronic device is selected and a second target content of the third electronic device is selected, processing the second target content based on a preset rule. The third operation is: searching, according to a target keyword selected by a user, the first content and/or the N second contents for a third target content including the target keyword. The third identifier and the fourth identifier are both identifiers of the first identifier and the N second identifiers; and the second electronic device and the third electronic device are both electronic devices of the N electronic devices.

Optionally, the target operation is the first operation, and the second input includes a first sub input and a second sub input. The execution module is configured to display a fifth identifier of the first target content on the screen of the first electronic device in response to the first sub input to the third identifier on the first interface; and in response to the second sub input to the fifth identifier, send the first target content to the second electronic device, add the first target content to the content indicated by the third identifier, and trigger the second electronic device to process the first target content according to a content type of the first target content.

Optionally, the target operation is the second operation, and the second input includes a third sub input and a fourth sub input. The execution module is configured to: in a case that the fourth identifier is displayed on the screen of the first electronic device, display a sixth identifier indicated by the second target content on the screen of the first electronic device in response to the third sub input to the fourth identifier; and process the second target content based on the preset rule in response to the fourth sub input to the sixth identifier.

Optionally, the preset rule is used to indicate any one of the following: saving the second target content to a target storage position of the first electronic device, where the target storage position is a user-defined storage position in the first electronic device, or a storage position associated with a content type of the second target content; or in a case that the second target content is an installation package of a target application of a first version, if the target application has not been installed in the first electronic device, installing the target application in the first electronic device according to the second target content; if the target application of a second version has been installed in the first electronic device and the second version is different from the first version, updating a version of the target application to the first version in the first electronic device according to the second target content; and if configuration information of the target application installed in the first electronic device is different from configuration information of the second target content, updating the configuration information of the target application in the first electronic device to the configuration information of the second target content; or in a case that the second target content is a target system profile, overwriting a system profile in the first electronic device with the target system profile in response to a selection input to the target system profile.

Optionally, an eighth identifier is displayed at a display position corresponding to a seventh identifier on the first interface, where the seventh identifier is an identifier of the first identifier and the N second identifiers, the eighth identifier is used to indicate that a fourth electronic device corresponding to the seventh identifier has updated the content shared in the sharing group; and the content updated by the fourth electronic device in the sharing group is sent by a fifth electronic device of the N electronic devices to the fourth electronic device, or is the content in the fourth electronic device.

The electronic device 80 provided in the embodiments of the present disclosure can implement the processes implemented by the electronic device in the foregoing method embodiments. To avoid repetition, details are not described herein again.

The electronic device provided in the embodiments of the present disclosure receives a first input for a first electronic device, and displays a first interface (i.e., a content sharing interface of a sharing group) on a screen of the first electronic device, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2. In this way, the first electronic device can obtain the entry to the content shared by each electronic device in the sharing group at the same moment, and then can obtain the content shared by the corresponding electronic device through any entry. There is no need to separately establish connections between one electronic device and two or more other electronic devices at different moments to share the screen interface and then share the content. In this way, the steps of sharing content among a plurality of electronic devices can be simplified, and the content shared among a plurality of electronic devices can be displayed quickly, easily and visually.

Figure 9:
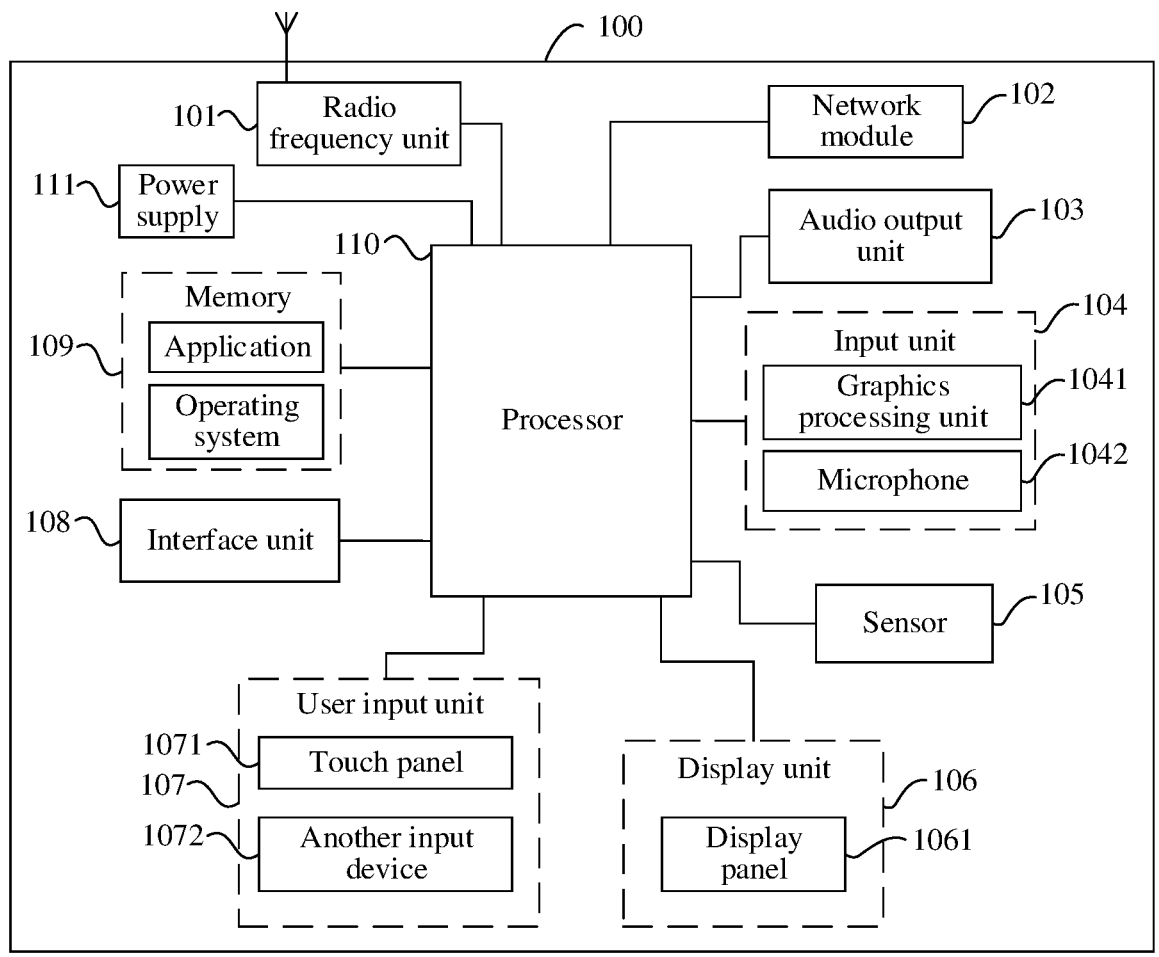
FIG. 9 is a schematic diagram of a hardware structure of an electronic device according to an embodiment of the present disclosure.

FIG. 9 is a schematic diagram of a hardware structure of an electronic device according to an embodiment of the present disclosure. The electronic device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device shown in FIG. 9 constitutes no limitation on the electronic device, and the electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palmtop computer, an in-vehicle electronic device, a wearable device, a pedometer, and the like.

The processor 110 is configured to control the user input unit 107 to receive a first input for a first electronic device; the displaying module 82 is configured to display a first interface on a screen of the first electronic device in response to the first input received by the user input unit 107, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to one second content, and the second content is the content shared in the target sharing group by one of the N electronic devices; and N is a positive integer greater than or equal to 2.

The electronic device provided in the embodiments of the present disclosure receives a first input for a first electronic device, and displays a first interface (i.e., a content sharing interface of a sharing group) on a screen of the first electronic device, the first interface including at least one of the following: a first identifier or N second identifiers, where the first electronic device is one of N electronic devices constituting a target sharing group, the first identifier is an entry to a first content, and the first content is the content shared in the target sharing group by at least two of the N electronic devices; the second identifier is an entry to a second content, and the second content is the content shared in the target sharing group by one of the N electronic devices; and N is a positive integer greater than or equal to 2. In this way, the first electronic device can obtain the entry to the content shared by each electronic device in the sharing group at the same moment, and then can obtain the content shared by the corresponding electronic device through any entry. There is no need to separately establish connections between one electronic device and two or more other electronic devices at different moments to share the screen interface and then share the content. In this way, the steps of sharing content among a plurality of electronic devices can be simplified, and the content shared among a plurality of electronic devices can be displayed quickly, easily and visually.

It should be understood that, in the embodiments of the present disclosure, the radio frequency unit 101 may be configured to receive and send information or receive and send a signal during a call. For example, after downlink data from a base station is received, the downlink data is sent to the processor 110 for processing. In addition, the uplink data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with the network and another device through a wireless communication system.

The electronic device provides wireless broadband Internet access for a user by using the network module 102, for example, helps the user to send and receive an email, browse a webpage, and access stream media, and the like.

The audio output unit 103 may convert audio data received by the radio frequency unit 101 or the network module 102 or stored in the memory 109 into audio signals and output the audio signals as sounds. In addition, the audio output unit 103 may further provide an audio output that is related to a particular function executed by the electronic device 100 (for example, a call signal receiving sound or a message receiving sound). The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a static picture or a video obtained by an image acquisition device (for example, a camera) in a video acquisition mode or an image acquisition mode. The processed image frame can be displayed on the display unit 106. An image frame that has been processed by the graphics processing unit 1041 may be stored in the memory 109 (or another storage medium) or sent by using the radio frequency unit 101 or the network module 102. The microphone 1042 can receive sounds and can process sounds such as audio data. The processed audio data can be converted, in a phone call mode, into a format that may be sent to a mobile communication base station via the radio frequency unit 101 for output.

The electronic device 100 may further include at least one sensor 105, such as an optical sensor, a motion sensor, and other sensors. The optical sensor includes an ambient light sensor and a proximity sensor. The ambient light sensor may adjust luminance of the display panel 1061 according to the brightness of the ambient light, and the proximity sensor may switch off the display panel 1061 and/or backlight when the electronic device 100 is moved to the ear. As one type of motion sensor, an accelerometer sensor may detect magnitudes of accelerations in various directions (which generally are triaxial), may detect a magnitude and a direction of the gravity when static, and may be configured to identify the attitude of the electronic device (for example, switching between landscape orientation and portrait orientation, a related game, and magnetometer attitude calibration), a function related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 106 is configured to display information input by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate key signal input related to the user setting and function control of the electronic device. The user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a stylus). The touch panel 1071 may include two parts: a touch detection apparatus and a touch controller. Where the touch detection apparatus detects a touch orientation of a user, and the signal transmitted by a touch operation, and transmits the signal to the touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 110. In addition, the touch controller receives a command transmitted by the processor 110 and execute the command. In addition, the touch panel 1071 may be implemented by using various types, such as a resistive type, a capacitive type, an infrared type, and a surface acoustic wave type. In addition to the touch panel 1071, the user input unit 107 may further include another input device 1072. Specifically, the another input device 1072 may include, but not limited to, a physical keyboard, a functional key (such as a volume control key or a switch key), a track ball, a mouse, and a joystick, which are not described herein in detail.

Optionally, the touch panel 1071 may cover the display panel 1061. After detecting a touch operation on or near the touch panel, the touch panel 1071 transfers the touch operation to the processor 110, to determine a type of a touch event. Then, the processor 110 provides a corresponding visual output on the display panel 1061 according to the type of the touch event. In FIG. 9, the touch panel 1071 and the display panel 1061 implement, as two independent parts, input and output functions of the electronic device. However, in some embodiments, the touch panel 1071 and the display panel 1061 may be integrated to implement the input and output functions of the electronic device, which is not specifically limited herein.

The interface unit 108 is an interface for connecting an external apparatus to the electronic device 100. For example, the interface unit 1708 may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 108 may be configured to receive an input (such as data information or electric power) from an external apparatus and transmit the received input to one or more elements in the electronic device 100 or may be configured to transmit data between the electronic device 100 and an external apparatus.

The memory 109 may be configured to store a software program and various data. The memory 109 may mainly include a program storage area and a data storage area. The program storage area may store an operating system, an application required by at least one function (for example, a sound playback function and an image display function), and the like; the data storage area may store data (such as audio data, phone book) created according to the use of the mobile phone, and the like. In addition, the memory 109 may include a high speed random access memory, and may further include a non-volatile memory, such as at least one magnetic disk storage device, a flash memory or another volatile solid-state storage device.

The processor 110 is the control center of the electronic device, and is connected to various parts of the electronic device by using various interfaces and lines. By running or executing the software program and/or module stored in the memory 109, and invoking data stored in the memory 109, the processor 110 performs various functions and data processing of the electronic device, thereby performing overall monitoring on the electronic device. The processor 110 may include one or more processing units. Preferably, the processor 110 may integrate an application processor and a modem processor. The application processor mainly processes an operating system, a user interface, an application, and the like. The modem processor mainly processes wireless communication. It may be understood that the foregoing modem processor may not be integrated into the processor 110.

The electronic device 100 may further include the power supply 111 (such as a battery) for supplying power to the components. Preferably, the power supply 111 may be logically connected to the processor 110 by a power management system, thereby implementing functions such as charging, discharging, and power consumption management by using the power management system.

In addition, the electronic device 100 includes some unshown functional modules, which are not repeated herein.

Preferably, the embodiments of the present disclosure further provide an electronic device, including a processor 110, a memory 109, and a computer program stored in the memory 109 and executable on the processor 110. The computer program, when executed by the processor 110, implements the processes of the method embodiments, and can achieve the same technical effects. To avoid repetition, details are not described herein again.

The embodiments of this application further provide a non-transitory computer-readable storage medium, storing a computer program, where the computer program is executed by a processor to implement each process of the foregoing embodiments of the content sharing method, and the same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be implemented in the form of a software product. The computer software product is stored in a storage medium (for example, a ROM/RAM, a magnetic disk, and an optical disc), and includes several instructions for instructing an electronic device (which may be a mobile phone, a computer, a server, an air conditioner, a network device, or the like) to perform the methods described in the embodiments of this application.

The embodiments of this application are described above with reference to the accompanying drawings. However, this application is not limited to the specific embodiments described above, and the specific embodiments described above are merely exemplary and not limitative. A person of ordinary skill in the art may make many forms without departing from the idea of this application and the protection scope of the claims. All of the forms shall fall within the protection of this application.

What is claimed is:

1. A content sharing method, applied to a first electronic device and comprising:
  receiving a first input for the first electronic device; and
  displaying a first interface on a screen of the first electronic device in response to the first input, the first interface comprising at least one of following: a first identifier or N second identifiers, wherein
  the first electronic device is one of N electronic devices constituting a target sharing group, the first identifier is an entry to a first content, the first content is a content shared in the target sharing group by at least two of the N electronic devices; a second identifier is an entry to a second content, and the second content is a content shared in the target sharing group by one of the N electronic devices; and N is a positive integer greater than or equal to 2;
  receiving a second input, wherein the second input comprises a first sub input and a second sub input;
  performing a target operation in response to the second input, wherein the performing a target operation in response to the second input comprises:
  displaying a fifth identifier of a first target content on the screen of the first electronic device in response to the first sub input to a third identifier corresponding to a second electronic device on the first interface;
  in response to the second sub input to the fifth identifier, sending the first target content to the second electronic device, adding the first target content to a content indicated by the third identifier, and triggering the second electronic device to process the first target content according to a content type of the first target content, wherein the third identifier is an identifier of the first identifier and the N second identifiers, and the second electronic device is an electronic device of the N electronic devices.

2. The method according to claim 1, wherein the first interface is a first desktop interface of the first electronic device, and the first input is an input to a desktop interface other than the first desktop interface of the first electronic device; or
  the first interface is a floating interface of the first electronic device, and the first input is an input to a floating control displayed on the screen of the first electronic device.

3. The method according to claim 1, wherein the first content comprises all data of all of the N electronic devices; and the second content comprises all data of one of the N electronic devices.

4. The method according to claim 1, further comprising:
  the target operation is a second operation, wherein the second operation is: in a case that a fourth identifier corresponding to a third electronic device is selected and a second target content of the third electronic device is selected, processing the second target content based on a preset rule;
  the target operation is a third operation, wherein the third operation is: searching, according to a target keyword selected by a user, the first content and/or the N second contents for a third target content comprising the target keyword; and
  the fourth identifier is an identifier of the first identifier and the N second identifiers; and the third electronic device is an electronic device of the N electronic devices.

5. The method according to claim 4, wherein the target operation is the second operation, and the second operation comprises a third sub input and a fourth sub input; and
  the performing the target operation in the response to the second input comprises:
  in a case that the fourth identifier is displayed on the screen of the first electronic device, displaying a sixth identifier indicated by the second target content on the screen of the first electronic device in response to the third sub input to the fourth identifier;
  processing the second target content based on the preset rule in response to the fourth sub input to the sixth identifier.

6. The method according to claim 5, wherein the preset rule is used to indicate any one of following:
  saving the second target content to a target storage position of the first electronic device, the target storage position being a user-defined storage position in the first electronic device, or a storage position associated with a content type of the second target content; or
  in a case that the second target content is an installation package of a target application of a first version, if the target application has not been installed in the first electronic device, installing the target application in the first electronic device according to the second target content; if the target application of a second version has been installed in the first electronic device and the second version is different from the first version, updating a version of the target application to the first version in the first electronic device according to the second target content; and if configuration information of the target application installed in the first electronic device is different from configuration information of the second target content, updating the configuration information of the target application in the first electronic device to the configuration information of the second target content; or in a case that the second target content is a target system profile, overwriting a system profile in the first electronic device with the target system profile in response to a selection input to the target system profile.

7. The method according to claim 1, wherein after the displaying a first interface on a screen of the first electronic device, the method further comprises:

displaying an eighth identifier at a display position corresponding to a seventh identifier on the first interface, wherein the seventh identifier is an identifier of the first identifier and the N second identifiers, the eighth identifier is used to indicate that a fourth electronic device corresponding to the seventh identifier has updated a content shared in the sharing group; and the content updated by the fourth electronic device in the sharing group is sent by a fifth electronic device of the N electronic devices to the fourth electronic device, or is the content in the fourth electronic device.

8. An electronic device, wherein the electronic device is a first electronic device, and comprises a processor, a memory, and a computer program stored in the memory and executable on the processor, wherein the computer program, when executed by the processor, causes the electronic device to perform:

receiving a first input for the first electronic device; and displaying a first interface on a screen of the first electronic device in response to the first input, the first interface comprising at least one of following: a first identifier or N second identifiers, wherein the first electronic device is one of N electronic devices constituting a target sharing group, the first identifier is an entry to a first content, the first content is a content shared in the target sharing group by at least two of the N electronic devices; a second identifier is an entry to a second content, and the second content is a content shared in the target sharing group by one of the N electronic devices; and N is a positive integer greater than or equal to 2;

receiving a second input, wherein the second input comprises a first sub input and a second sub input;

performing a target operation in response to the second input, wherein the computer program, when executed by the processor, causes the electronic device to further perform:

displaying a fifth identifier of a first target content on the screen of the first electronic device in response to the first sub input to a third identifier corresponding to a second electronic device on the first interface;

in response to the second sub input to the fifth identifier, sending the first target content to the second electronic device, adding the first target content to a content indicated by the third identifier, and triggering the second electronic device to process the first target content according to a content type of the first target content, wherein the third identifier is an identifier of the first identifier and the N second identifiers, and the second electronic device is an electronic device of the N electronic devices.

9. The electronic device according to claim 8, wherein the first interface is a first desktop interface of the first electronic device, and the first input is an input to a desktop interface other than the first desktop interface of the first electronic device; or the first interface is a floating interface of the first electronic device, and the first input is an input to a floating control displayed on the screen of the first electronic device.

10. The electronic device according to claim 8, wherein the first content comprises all data of all of the N electronic devices; and the second content comprises all data of one of the N electronic devices.

11. The electronic device according to claim 8, the computer program, when executed by the processor, causes the electronic device to further perform:

the target operation is a second operation, wherein the second operation is: in a case that a fourth identifier corresponding to a third electronic device is selected and a second target content of the third electronic device is selected, processing the second target content based on a preset rule;

the target operation is a third operation, wherein the third operation is: searching, according to a target keyword selected by a user, the first content and/or the N second contents for a third target content comprising the target keyword; and the fourth identifier is an identifier of the first identifier and the N second identifiers; and the third electronic device is an electronic device of the N electronic devices.

12. The electronic device according to claim 8, wherein the target operation is the second operation, and the second operation comprises a third sub input and a fourth sub input; and the computer program, when executed by the processor, causes the electronic device to perform:

in a case that the fourth identifier is displayed on the screen of the first electronic device, displaying a sixth identifier indicated by the second target content on the screen of the first electronic device in response to the third sub input to the fourth identifier;

processing the second target content based on the preset rule in response to the fourth sub input to the sixth identifier.

13. The electronic device according to claim 12, wherein the preset rule is used to indicate any one of following:

saving the second target content to a target storage position of the first electronic device, the target storage position being a user-defined storage position in the first electronic device, or a storage position associated with a content type of the second target content; or in a case that the second target content is an installation package of a target application of a first version, if the target application has not been installed in the first electronic device, installing the target application in the first electronic device according to the second target content; if the target application of a second version has been installed in the first electronic device and the second version is different from the first version, updating a version of the target application to the first version in the first electronic device according to the second target content; and if configuration information of the target application installed in the first electronic device is different from configuration information of the second target content, updating the configuration information of the target application in the first electronic device to the configuration information of the second target content; or in a case that the second target content is a target system profile, overwriting a system profile in the first electronic device with the target system profile in response to a selection input to the target system profile.

14. The electronic device according to claim 8, wherein the computer program, when executed by the processor, causes the electronic device to further perform:

displaying an eighth identifier at a display position corresponding to a seventh identifier on the first interface, wherein the seventh identifier is an identifier of the first identifier and the N second identifiers, the eighth identifier is used to indicate that a fourth electronic device corresponding to the seventh identifier has updated a content shared in the sharing group; and the content updated by the fourth electronic device in the sharing group is sent by a fifth electronic device of the N electronic devices to the fourth electronic device, or is the content in the fourth electronic device.

15. A non-transitory computer-readable storage medium, storing a computer program, wherein the computer program, when executed by a processor of an electronic device, causes the electronic device to perform:

receiving a first input for the first electronic device; and displaying a first interface on a screen of the first electronic device in response to the first input, the first interface comprising at least one of following: a first identifier or N second identifiers, wherein the first electronic device is one of N electronic devices constituting a target sharing group, the first identifier is an entry to a first content, the first content is a content shared in the target sharing group by at least two of the N electronic devices; a second identifier is an entry to a second content, and the second content is a content shared in the target sharing group by one of the N electronic devices; and N is a positive integer greater than or equal to 2;

receiving a second input, wherein the second input comprises a first sub input and a second sub input;

performing a target operation in response to the second input, wherein the computer program, when executed by the processor, causes the electronic device to further perform:

displaying a fifth identifier of a first target content on the screen of the first electronic device in response to the first sub input to a third identifier corresponding to a second electronic device on the first interface;

in response to the second sub input to the fifth identifier, sending the first target content to the second electronic device, adding the first target content to a content indicated by the third identifier, and triggering the second electronic device to process the first target content according to a content type of the first target content, wherein the third identifier is an identifier of the first identifier and the N second identifiers, and the second electronic device is an electronic device of the N electronic devices.

16. The non-transitory computer-readable storage medium according to claim 15, wherein the first interface is a first desktop interface of the first electronic device, and the first input is an input to a desktop interface other than the first desktop interface of the first electronic device; or the first interface is a floating interface of the first electronic device, and the first input is an input to a floating control displayed on the screen of the first electronic device.

17. The non-transitory computer-readable storage medium according to claim 15, wherein the first content comprises all data of all of the N electronic devices; and the second content comprises all data of one of the N electronic devices.

18. The non-transitory computer-readable storage medium according to claim 15, the computer program, when executed by the processor, causes the electronic device to further perform:

the target operation is a second operation, wherein the second operation is: in a case that a fourth identifier corresponding to a third electronic device is selected and a second target content of the third electronic device is selected, processing the second target content based on a preset rule;

the target operation is a third operation, wherein the third operation is: searching, according to a target keyword selected by a user, the first content and/or the N second contents for a third target content comprising the target keyword; and the fourth identifier is an identifier of the first identifier and the N second identifiers; and the third electronic device is an electronic device of the N electronic devices.

19. The non-transitory computer-readable storage medium according to claim 15, wherein the target operation is the second operation, and the second operation comprises a third sub input and a fourth sub input; and the computer program, when executed by the processor, causes the electronic device to perform:

in a case that the fourth identifier is displayed on the screen of the first electronic device, displaying a sixth identifier indicated by the second target content on the screen of the first electronic device in response to the third sub input to the fourth identifier;

processing the second target content based on the preset rule in response to the fourth sub input to the sixth identifier.

20. The non-transitory computer readable storage medium according to claim 19, wherein the preset rule is used to indicate any one of following:

saving the second target content to a target storage position of the first electronic device, the target storage position being a user-defined storage position in the first electronic device, or a storage position associated with a content type of the second target content; or in a case that the second target content is an installation package of a target application of a first version, if the target application has not been installed in the first electronic device, installing the target application in the first electronic device according to the second target content; if the target application of a second version has been installed in the first electronic device and the second version is different from the first version, updating a version of the target application to the first version in the first electronic device according to the second target content;

and if configuration information of the target application installed in the first electronic device is different from configuration information of the second target content, updating the configuration information of the target application in the first electronic device to the configuration information of the second target content; or in a case that the second target content is a target system profile, overwriting a system profile in the first electronic device with the target system profile in response to a selection input to the target system profile.

\* \* \* \* \*